United States Patent [19]

Quick

[11] Patent Number: 4,930,730
[45] Date of Patent: Jun. 5, 1990

[54] NEUTRAL POSITION LOCKING SYSTEM FOR AIRCRAFT CONTROL SURFACES

[75] Inventor: David C. Quick, Rockford, Ill.

[73] Assignee: Sundstrand Corporation, Rockford, Ill.

[21] Appl. No.: 134,757

[22] Filed: Dec. 18, 1987

[51] Int. Cl.[5] ............................................. B64C 13/14
[52] U.S. Cl. .................................. 244/224; 244/75 A
[58] Field of Search ................... 244/75 A, 224, 75 R, 244/76 R; 114/170, 171, 172

[56] References Cited

U.S. PATENT DOCUMENTS

| 2,528,645 | 11/1950 | Edwards | 60/53 R |
| 2,835,459 | 5/1958 | Stewart | 244/224 |
| 3,599,507 | 8/1971 | Exton | 74/469 |
| 3,662,550 | 5/1972 | Lichtfuss | 60/53 R |
| 3,943,713 | 3/1976 | Walton | 60/395 |
| 4,173,322 | 11/1979 | Macdonald | 244/75 A |
| 4,496,121 | 1/1985 | Berlin | 244/75 A |
| 4,498,647 | 2/1985 | Boehringer et al. | 244/75 A |
| 4,526,058 | 7/1985 | Runkel et al. | 74/531 |

Primary Examiner—Sherman D. Basinger
Assistant Examiner—Rodney Corl
Attorney, Agent, or Firm—Wood, Dalton, Phillips, Mason & Rowe

[57] ABSTRACT

An automatic neutral position locking system for a control surface of an aircraft. A hydraulic prime mover is provided for moving the control surface. A locking device is capable of locking the control surface against movement. A ratchet-and-pawl device is operatively associated with a rotary drive train between the prime mover and the control surface for actuating the locking device in response to the control surface reaching a neutral position. The ratchet-and-pawl device normally is maintained in inactive condition when hydraulic pressure exists in the prime mover. A pneumatic piston-and-cylinder device, when under pressure, maintains the ratchet-and-pawl device in normally inactive condition. With a loss of hydraulic pressure, the ratchet-and-pawl device is effective to actuate the locking device in response to the control surface itself reaching the neutral position as the control surface moves under external loads.

16 Claims, 2 Drawing Sheets

NEUTRAL POSITION LOCKING SYSTEM FOR AIRCRAFT CONTROL SURFACES

FIELD OF THE INVENTION

This invention relates to locking systems for aircraft control surfaces and, particularly, to an automatic neutral position locking system for such a control surface.

BACKGROUND OF THE INVENTION

In the operation of aircraft control surfaces, the loss of driving input may allow external loads to backdrive the actuation system and control surfaces in an uncontrolled manner, sometimes called "fluttering". In order to prevent such uncontrolled conditions, many types of no-back devices have been developed, only a couple of which are shown in U.S. Pat. Nos. 3,599,507, dated Aug. 17, 1971, and 4,173,322, dated Nov. 6, 1979. Such systems as shown in those patents use internal forces, such as spring forces, to force a control surface into a neutral position. It not only is desirable to prevent uncontrolled fluttering of the control surface, but it also, however, would be desirable to permit the external loads (i.e. through the control surface itself) to drive the control surface to a neutral or "faired" position and then lock the control surface in that position.

In situations where a prime mover is used to provide torque to the flight control surface, hydraulic pressure often is used in the prime mover means. It would be desirable to provide an automatic neutral position locking system for the control surface should that hydraulic pressure be lost. Air flow against the control surface will tend to move it toward the neutral position. This invention takes advantage of that tendency by permitting the control surface to move toward the neutral position, but prevents external forces or loads, such as the air flow, from moving the control surface in a direction away from the neutral position. In other words, the control surface itself may be operatively associated within the system to effectively actuate the locking means.

SUMMARY OF THE INVENTION

An object, therefore, of the invention is to provide a new and improved, automatic neutral position locking system for a control surface of an aircraft and the like.

Generally, in the exemplary embodiment of the invention, hydraulic prime mover means move the control surface. Means are provided for locking the control surface against movement. Means are provided for actuating the locking means in response to the control surface reaching a neutral position. The actuating means normally is inactive when hydraulic pressure is present in the prime mover means. Means are provided responsive to a loss of hydraulic pressure for activating the actuating means to lock the control surface in neutral position responsive to the control surface itself reaching the neutral position.

As disclosed herein, rotary drive means are provided between the prime mover means and the control surface. The actuating means generally include ratchet-and-pawl means in the rotary drive means. The ratchet-and-pawl means include a first ratchet-and-pawl device effective to prevent movement of the control surface away from the neutral position in one direction, and a second ratchet-and-pawl device effective to prevent movement of the control surface away from the neutral position in an opposite direction.

The means for activating the actuating means include a pneumatic piston-and-cylinder device which is in hydraulic communication with the hydraulic prime mover means. The piston-and-cylinder device is operatively associated with the actuating means and, when under pressure, maintains the actuating means in normally inactive condition.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
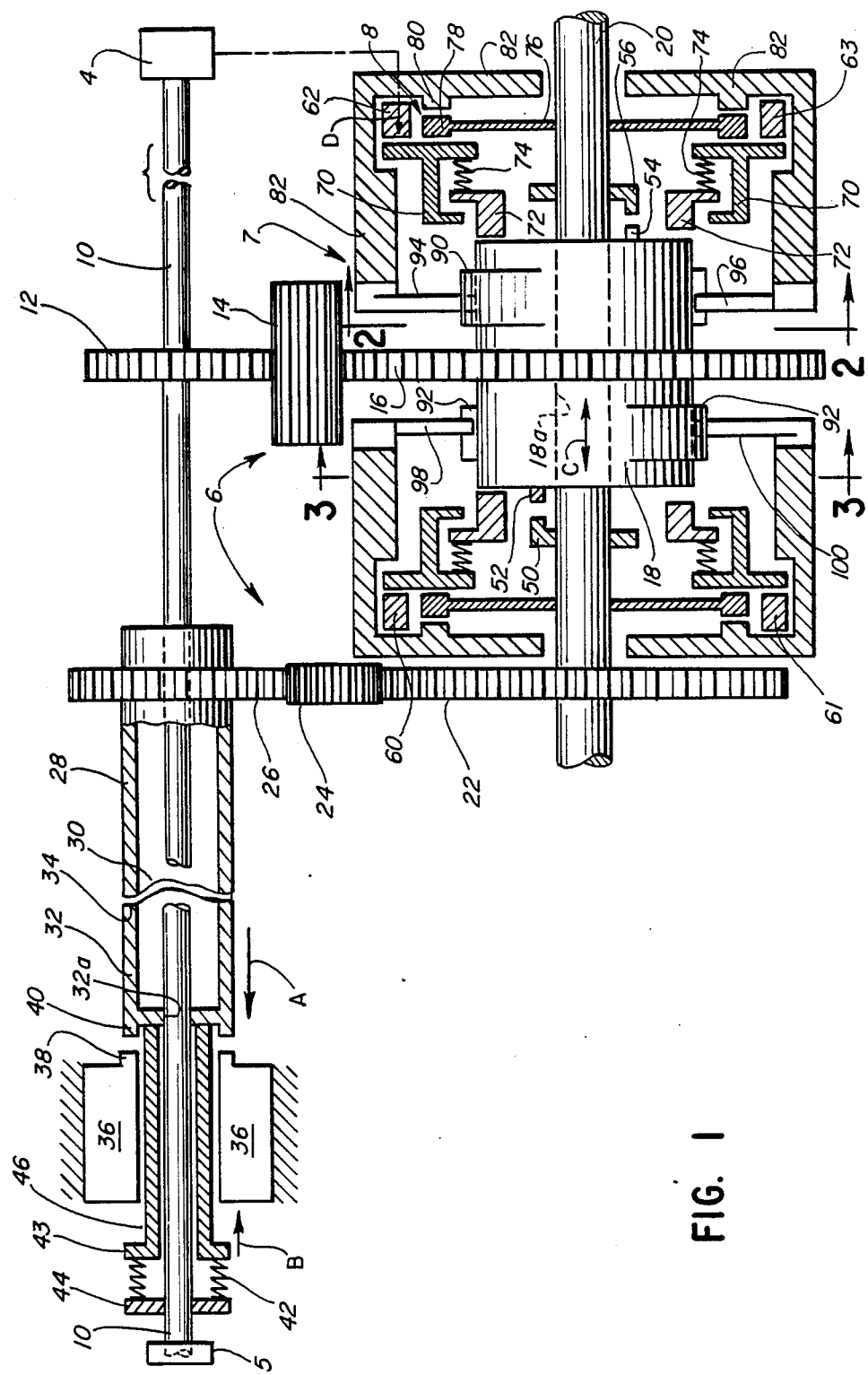
FIG. 1 is a schematic block diagram of the automatic neutral position locking system of the invention.

Referring to the drawings in greater detail, and first to FIG. 1, the invention is directed to an automatic neutral position locking system for a control surface of an aircraft and the like. The system is shown schematically and substantially in block-diagram form and is disposed between a prime mover means 4 and a control surface 5. The prime mover means is operated hydraulically, as is conventional in many flight control systems, and is effective to move control surface 5 between extreme positions on opposite sides of a neutral position, such as up and down in relation to a flap of an airplane.

Generally, the invention includes locking means, generally designated 6, for locking control surface 5 against movement; rotary drive means, generally designated 6, between the prime mover means and the control surface; actuating means, generally designated 7, for actuating the locking means in response to the control surface reaching a neutral position, with the actuating means normally being inactive in response to the existence of hydraulic pressure in prime mover means 4; and activating means, generally designated 8, responsive to a loss of hydraulic pressure to the prime mover means for activating actuating means 7 to lock the control surface in neutral position responsive to the control surface itself reaching the neutral position.

More particularly, a shaft 10 is connected between prime mover means 4 and control surface 5. A gear 12 is fixed to shaft 10 and is connected in driving engagement with a gear 14. Gear 14 is in meshed driving engagement with a gear 16 which, in turn, is fixed to a rotatable member 18. The rotatable member 18 is in the form of a nut having an internal thread 18a in mesh with a threaded shaft 20. A gear 22 is fixed to threaded shaft 20 and is in meshed driving engagement with a gear 24 which, in turn, is in meshed driving engagement with a gear 26 fixed to a tubular member 28. Tubular member 28 has an end shaped in a cam-like configuration 30. It should be noted that tubular member 28 is not attached to shaft 10, but rotates around the shaft in concentric and coaxial relation thereto. Another tubular member 32 is attached, as by a spline 32a, to shaft 10 and is provided with an end shaped with a cam-like surface 34. The two cam-like surfaces 30,34 are disposed in confronting relation as shown in FIG. 1. A grounded member 36 is disposed about shaft 10 and is provided with a circular array of teeth 38 which are disposed in opposing relation to a similar circular array of teeth 40 on an end of tubular member 32 opposite cam surface 34, tubular member 32 being fixed to shaft 10 as described.

From the foregoing, it can be understood that if tubular member 28 rotates relative to tubular member 32, cam surfaces 30,34 will move tubular member 32 to the left, as indicated by arrow "A", whereupon circular toothed arrays 38,40 will engage and tubular member 32 will be locked to grounded member 36. This prevents rotation of tubular member 32, shaft 10 and control surface 5.

A spring 42 is sandwiched between a flange 44 projecting radially outwardly from shaft 10 and a flange 43 projecting radially outwardly from another tubular member 46. The spring acts through tubular member 46 to exert an axial force against tubular member 32, in the direction of arrow "B". This biases toothed arrays 38 and 40 to disengaged condition, as shown, with cam surface 30,34 in mating engagement, as shown.

The drive train or drive means 6 afforded by gears 12,14,16,22,24 and 26 is designed with appropriate gear sizes and threaded relationships such that rotatable member 18 and shaft 20 rotate at different rates. In other words, if rotatable member 18 rotates at a different rate than shaft 20, it will translate on the shaft in an axial direction, as indicated by double-headed arrow "C" depending upon the relative rates of rotation of these two devices and their screw-threaded relationship. In order to provide limits of travel in the axial direction, stops 50,52 and 54,56 are provided on rotatable member 18 and shaft 20.

In order to detect the existence of hydraulic pressure in the control surface drive system, i.e. in hydraulic prime mover means 4, a plurality of pneumatic piston-and-cylinder devices 60,61,62 and 63 are employed. These pistons sense the existence of hydraulic pressure in the actuating system and react appropriately to a loss of the hydraulic pressure as described hereinafter.

When proper hydraulic pressure exists in the system, pistons 60–63 exert a pressure in a direction axially inwardly toward rotatable member 18. Since all four pistons operate in conjunction with similar components, only one will be described, namely piston-and-cylinder device 62. The piston of that device exerts a pressure in the direction of arrow "D" when pressure exists in the system. This causes a member 70 to be moved toward the left (i.e. arrow "D" as viewed in the drawing), so that member 70 is maintained in a position as shown. A ball bearing member 72 rides on an axial face of rotatable member 18, and a coil spring 74 is sandwiched between ball bearing member 72 and member 70 which is backed by piston-and-cylinder device 62.

Therefore, when rotatable member 18 moves toward the right, as viewed in FIG. 1, it engages ball bearing member 72 and, as rotatable member 18 continues to move toward the right, ball bearing member 72 rides on its axial face and moves toward the right. This axial movement of the ball bearing member 72 causes spring 74 to compress. However, when pressure exists within the system, piston 62 prevents movement of member 70 toward the right as long as the pressure exists. Other than the effect of stops 54,56, rotatable member 18 is free to move toward the right without causing any effect on member 70 because piston 62 prevents member 70 from moving toward the right. Ball bearing member 72 simple acts against spring 74.

Again, it should be understood that the above description and the description immediately below, concerning piston 62 and the associated components is equally true for piston 63 and its related components which also act in conjunction with movement of rotatable member 18 toward the right.

When a loss of hydraulic pressure occurs, piston 62 and 63 no longer prevent axial movement of member 70 toward the right. Therefore, rather than spring 74 simply being compressed, rotatable member 18 can cause ball bearing member 72 to move toward the right and cause member 70 also to move toward the right. A flexible brake arm 76 is fixed to shaft 20 and is provided with a generally annularly shaped friction brake pad 78. Movement of member(s) 72 toward the right will force brake pad 78 against a complementary brake pad 80 on a support structure 82. This structure forms the means 8 responsive to a loss of hydraulic pressure to prime mover means 4 for activating actuating means 7.

Figure 2:
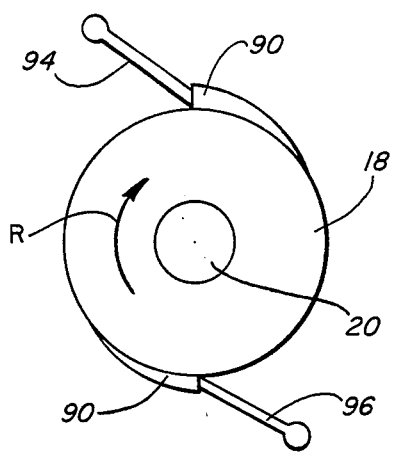
FIG. 2 is an axial section showing the first ratchet-and-pawl device for preventing the control surface from moving in one direction.

Actuating means 7 include ratchet ramps 90 and 92 on rotatable member 18. Support structures 82 are provided with ratchet palls 94,96,98 and 100, it being understood that ratchet ramps 90 and ratchet palls 94,96 being associated with right-hand movement of rotatable member 18 as viewed in the drawing. These ratchet-and-pawl devices are shown in detail in FIGS. 2 and 3 and will be described hereinafter. In operation, when support structure 82 is caused to rotate with shaft 20 because of the action between brake pads 78 and 80 being engaged by member 70 providing a compressive force, through spring 74, to the brake pads, ratchet palls 94 and 96 will engage ratchet ramps 90 to force support structure 82 to rotate in synchronization with rotatable member 18. Under these conditions, shaft 20, structure 82 and rotatable member 18 will rotate in unison. The gearing relationships between gears 12,14,16,22,24 and 26 are selected such that synchronous rotation of shaft 20 and rotatable member 18 will cause relative rotation between tubular member 28 and tubular member 32. This relative rotation will cause cam surfaces 30 and 34 to exert an axial force in the direction of arrow "A" (i.e. toward the left), against tubular member 32 and cause toothed arrays 38 and 40 to mesh. This results in shaft 10 being stopped from further rotation and thereby stops movement of control surface 5.

Now, if shaft 10 is caused to rotate in the opposite direction, as by external loads on the control surface, the axial force against tubular member 32 will be alleviated, due to the cam, and rotation will be permitted. This opposite direction of rotation will cause ratchet palls 94 and 96 to permit rotatable member 18 to rotate because the palls will pass over the ratchet ramps 90. In other words, referring to FIG. 2, it can be seen that rotatable member 18 will be permitted to rotate in the direction of arrow "R" but is prohibited from rotating in an opposite direction.

Figure 3:
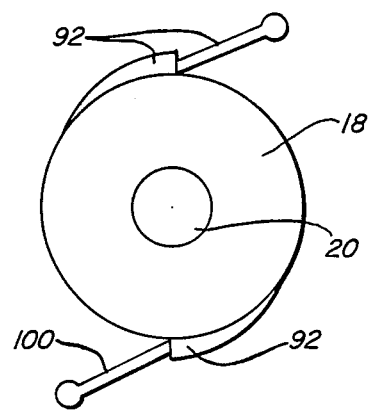
FIG. 3 is an axial section showing the second ratchet-and-pawl device for preventing the control surface from moving in the opposite direction.

It should be emphasized that the left-hand side of the system described in FIG. 1, i.e. piston-and-cylinder devices 60 and 61, the related components with reference numerals described above, ratchet ramps 92 and ratchet palls 98,100 along with FIG. 3, operate in identical fashion to that described in relation to the right-hand portion of the system as viewed in the drawings. For example, should the control surface be a flap on an airplane wing, movement of the control surface down to a neutral position would be the same as movement of the control surface up to the neutral position. All of the functions simply are operative in a reverse direction in response to movement or rotatable member in an axial direction toward the left, with piston-and-cylinder devices 60 and 61 having lost pressure. With this understanding, it can be seen that when rotatable member 18 is located at its central position, i.e. the neutral position of control surface 5, the devices described above will function to lock the rotatable member and the control surface in its neutral position. It also can be understood that the control surface is not forced by operative components to its neutral position as is prevalent in the prior art, as by springs or other internal forces, when hydraulic pressure is lost. The structure described above in accordance with the invention, allows external forces, i.e. the air flow, to drive the control surface toward its neutral position whereupon it is locked. This system is much simpler and practically fail-safe than providing positive driving means which could become defective. Structurally, brakes 78,80 do not themselves lock the control surface. They simply "signal", through structure, fail-safe cam surfaces 30,34 to lock the control surface.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An automatic neutral position locking system for a control surface of an aircraft and the like, comprising:
   hydraulic prime mover means for moving the control surface;
   means for locking the control surface against movement;
   means for actuating the locking means in response to the control surface reaching a neutral position, the actuating means normally being inactive in response to the existence of hydraulic pressure in the prime mover means; and
   means responsive to a loss of hydraulic pressure to the prime mover means for activating the actuating means to lock the control surface in neutral position responsive to the control surface itself reaching the neutral position.

2. The automatic neutral position locking system of claim 1 including rotary drive means between the prime mover means and the control surface, and wherein said actuating means include ratchet-and-pawl means in the rotary drive means.

3. The automatic neutral position locking system of claim 2 wherein said ratchet-and-pawl means include a first ratchet-and-pawl device effective to prevent movement of the control surface away from the neutral position in one direction and a second ratchet-and-pawl device effective to prevent movement of the control surface away from the neutral position in an opposite direction.

4. The automatic neutral position locking system of claim 1 wherein said means for activating the actuating means include a pneumatic piston-and-cylinder device.

5. The automatic neutral position locking system of claim 4 wherein said pneumatic piston-and-cylinder device is in hydraulic communication with said hydraulic prime mover means.

6. The automatic neutral position locking system of claim 5 wherein said pneumatic piston-and-cylinder device is operatively associated with the actuating means and, when under pressure, maintains the actuating means in normally inactive condition.

7. An automatic neutral position locking system for a control surface of an aircraft and the like, comprising:
   hydraulic prime mover means for moving the control surface;
   means for locking the control surface against movement;
   rotary drive means between the prime mover means and the control surface;
   ratchet-and-pawl means in the rotary drive means for actuating the locking means in response to the control surface reaching a neutral position, the ratchet-and-pawl means normally being inactive in response to the existence of hydraulic pressure in the prime mover means; and
   pneumatic piston-and-cylinder means responsive to a loss of hydraulic pressure to the prime mover means for activating the ratchet-and-pawl means to lock the control surface in neutral position responsive to the control surface reaching the neutral position.

8. The automatic neutral position locking system of claim 7 wherein said ratchet-and-pawl means include a first ratchet-and-pawl device effective to prevent movement of the control surface away from the neutral position in one direction and a second ratchet-and-pawl device effective to prevent movement of the control surface away from the neutral position in an opposite direction.

9. The automatic neutral position locking system of claim 7 wherein said pneumatic piston-and-cylinder device is in hydraulic communication with said hydraulic prime mover means.

10. The automatic neutral position locking system of claim 9 wherein said pneumatic piston-and-cylinder device is operatively associated with the actuating means and, when under pressure, maintains the actuating means in normally inactive condition.

11. The automatic neutral position locking system of claim 10 including brake means operatively associated between the rotary drive means and the ratchet-and-pawl means for engagement to activate the ratchet-and-pawl means in response to the loss of pressure.

12. An automatic neutral position locking system for a control surface of an aircraft and the like, comprising:
   means for locking the control surface against movement;
   means for actuating the locking means in response to the control surface reaching a neutral position; and
   means responsive to a loss of hydraulic pressure in the system for activating the actuating means to lock the control surface in neutral position responsive to the control surface itself reaching the neutral position.

13. The automatic neutral position locking system of claim 12 including rotary drive means between the prime mover means and the control surface, and wherein said actuating means include ratchet-and-pawl means in the rotary drive means.

14. The automatic neutral position locking system of claim 13 wherein said ratchet-and-pawl means include a first ratchet-and-pawl device effective to prevent movement of the control surface away from the neutral position in one direction and a second ratchet-and-pawl device effective to prevent movement of the control surface away from the neutral position in an opposite direction.

15. The automatic neutral position locking system of claim 12 wherein said means for activating the actuating means include a pneumatic piston-and-cylinder device.

16. The automatic neutral position locking system of claim 15 wherein said pneumatic piston-and-cylinder device is operatively associated with the actuating means and, when under pressure, maintains the actuating means in normally inactive condition.

* * * * *